US012059905B2

(12) United States Patent
Kawano

(10) Patent No.: US 12,059,905 B2
(45) Date of Patent: Aug. 13, 2024

(54) INK-JET RECORDING APPARATUS

(71) Applicant: KYOCERA Document Solutions Inc., Osaka (JP)

(72) Inventor: Daichi Kawano, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 154 days.

(21) Appl. No.: 17/873,765

(22) Filed: Jul. 26, 2022

(65) Prior Publication Data

US 2023/0029580 A1 Feb. 2, 2023

(30) Foreign Application Priority Data

Jul. 28, 2021 (JP) ................................ 2021-123054

(51) Int. Cl.
*B41J 2/175* (2006.01)
*B41J 2/205* (2006.01)
*B41J 2/21* (2006.01)

(52) U.S. Cl.
CPC ......... *B41J 2/17566* (2013.01); *B41J 2/2054* (2013.01); *B41J 2/2132* (2013.01); *B41J 2002/17569* (2013.01)

(58) Field of Classification Search
CPC .................... B41J 2/17566; B41J 2002/17569
See application file for complete search history.

(56) References Cited

U.S. PATENT DOCUMENTS

2002/0089555 A1* 7/2002 Kobayashi ........... B41J 2/17523 347/7
2003/0025741 A1* 2/2003 Maeda ................. B41J 2/17566 347/7

FOREIGN PATENT DOCUMENTS

JP 2004130638 A * 4/2004
JP 2005-280343 A 10/2005
JP 2016043625 A * 4/2016 .......... B41J 2/16508

* cited by examiner

*Primary Examiner* — Sharon Polk
(74) *Attorney, Agent, or Firm* — Stein IP, LLC

(57) ABSTRACT

An ink-jet recording apparatus includes a recording head, an ink reservoir portion, an ink amount sensor, a dot counter, and a control portion. The ink reservoir portion stores ink to be fed to the recording head. The ink amount sensor senses the amount of ink in the ink reservoir portion. The dot counter for measures in a cumulative manner the number of dots in the ink ejected from the recording head. The control portion changes the amount of ink ejected from the recording head based on the difference between a calculated value of the amount of consumed ink as calculated based on the cumulative number of dots measured by the dot counter and a measured value of the amount of consumed ink as determined based on the amount of ink in the ink reservoir portion as sensed by the ink amount sensor.

8 Claims, 4 Drawing Sheets

INK-JET RECORDING APPARATUS

INCORPORATION BY REFERENCE

This application is based on and claims the benefit of priority from Japanese Patent Application No, 2021-123054 filed on July 28, 2021, the contents of which are hereby incorporated by reference.

BACKGROUND

The present disclosure relates to ink-jet recording apparatuses.

An ink-jet recording apparatus includes a recording head that ejects ink onto a recording medium such as a sheet of paper to record an image on it. On an ink-jet recording apparatus, the amount of ink ejected from the recording head needs to be controlled optimally to maintain satisfactory image quality and satisfactory image recording productivity.

SUMMARY

According to one aspect of the present disclosure, an ink-jet recording apparatus includes a recording head an ink reservoir portion, an ink amount sensor, a dot counter, and a control portion. The recording head has a plurality of nozzles for ejecting ink onto a recording medium. The ink reservoir portion stores ink to be fed to the recording head. The ink amount sensor senses the amount of ink in the ink reservoir portion. The dot counter measures in a cumulative manner the number of dots in the ink ejected from the recording head. The control portion controls the operation of the recording head to record an image on the recording medium. The control portion changes the amount of ink ejected from the recording head based on the difference between a calculated value of the amount of consumed ink as calculated based on the cumulative number of dots measured by the dot counter and a measured value of the amount of consumed ink as determined based on the amount of ink in the ink reservoir portion as sensed by the ink amount sensor.

DETAILED DESCRIPTION

An embodiment of the present disclosure will be described below with reference to the accompanying drawings. What is specifically disclosed herein is not meant to limit the scope of the present disclosure.

Figure 1:
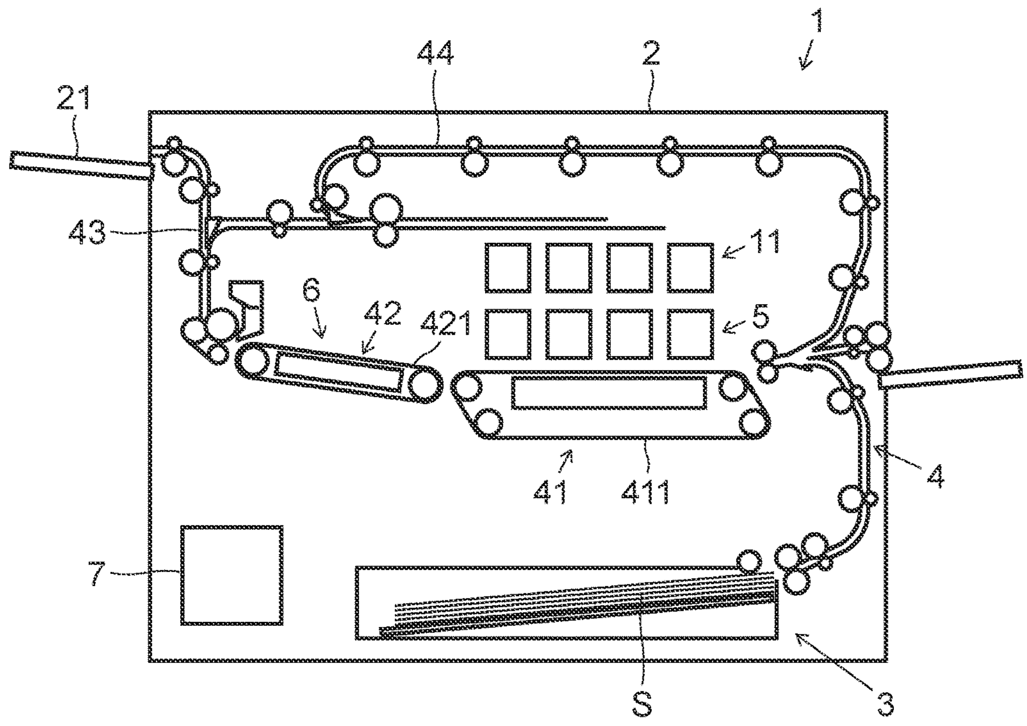
FIG. 1 is a schematic sectional front view of an ink-jet recording apparatus according to one embodiment of the present disclosure.
Figure 2:
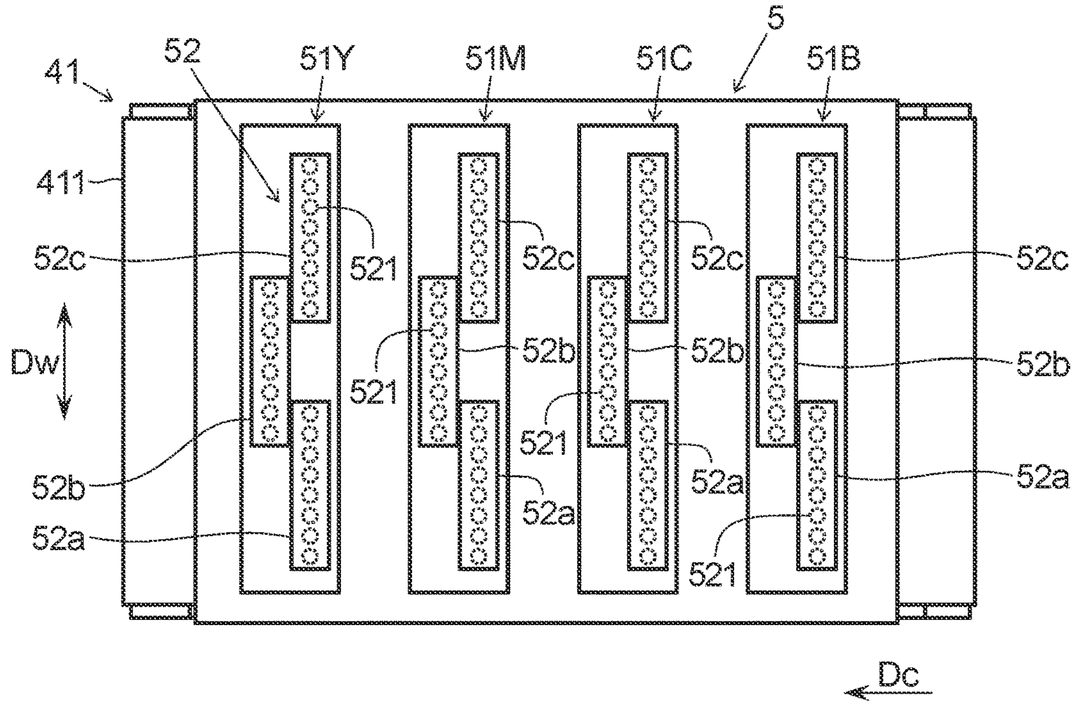
FIG. 2 is a plan view around a recording portion in the ink-jet recording apparatus in FIG. 1.
Figure 3:
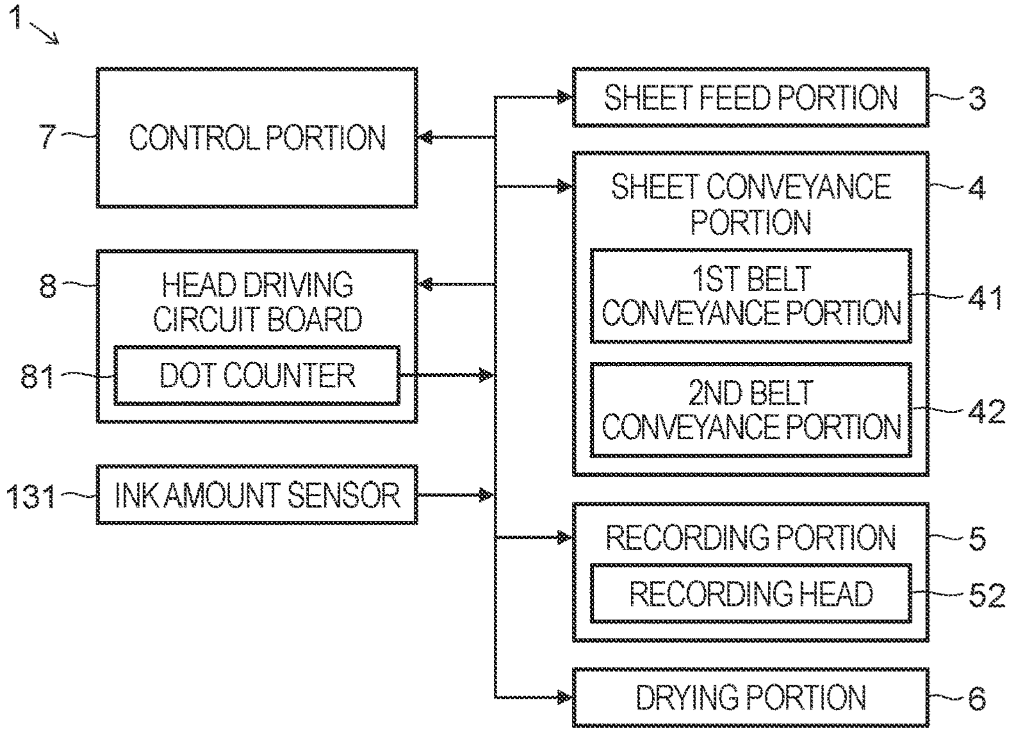
FIG. 3 is a block diagram showing an outline configuration of the ink-jet recording apparatus in FIG. 1.

FIG. 1 is a schematic sectional front view of an ink jet recording apparatus 1 according to the embodiment. FIG. 2 is a plan view around a recording portion 5 in the ink-jet recording apparatus 1 in FIG. 1. FIG. 3 is a block diagram showing an outline configuration of the ink jet recording apparatus 1 in FIG. 1. The ink-jet recording apparatus 1 is, for example, a printer of an ink-jet recording type. As shown in FIGS. 1, 2, and 3, the ink-jet recording apparatus 1 includes an apparatus body 2, a sheet feed portion 3, a sheet conveyance portion 4, the recording portion 5, a drying portion 6, and a control portion 7.

The sheet feed portion 3 stores a plurality of sheets S (of a recording medium) and, during recording, feeds out one sheet S after another separately. The sheet conveyance portion 4 conveys a sheet S fed out from the sheet feed portion 3 toward the recording portion 5 and the drying portion 6, and discharges the sheet S having undergone recording and drying onto a sheet discharge portion 21. In duplex recording, the sheet conveyance portion 4 controls a branch portion 43 to distribute a sheet S having undergone recording and drying on its first side to a reversing conveyance portion 44, and switches its conveyance direction so that the sheet S reversed top side down will be conveyed once again toward the recording portion 5 and the drying portion 6.

The sheet conveyance portion 4 includes a first belt conveyance portion 41 and a second belt conveyance portion 42. The first belt conveyance portion 41 has a first conveyance belt 411 formed as an endless belt. The second belt conveyance portion 42 has a second conveyance belt 421 formed as an endless belt. The first and second belt conveyance portions 41 and 42 convey the sheet S in a state held by suction on the upper outer surfaces (top surfaces) of the first and second conveyance belts 411 and 421 respectively. The first belt conveyance portion 41 is disposed under the recording portion 5 to convey the sheet S. The second belt conveyance section 42 is located downstream of the first belt conveyance portion 41 in the sheet conveyance direction, and is disposed in the drying portion 6 to convey the sheet S.

The recording portion 5 faces the sheet S conveyed in a state held by suction on the top surface of the first conveyance belt 411, and is disposed over the first conveyance belt 411 across a predetermined distance. The recording portion 5 holds head units 51B, 51C, 51M, and 51Y corresponding to four colors, namely black, cyan, magenta, and yellow, respectively. The head units 51B, 51C, 51M, and 51Y are disposed side by side along the sheet conveyance direction Dc such that their longitudinal direction is parallel to the sheet width direction Dw orthogonal to the sheet conveyance direction Dc. The four head units 51B, 51C, 51M, and 51Y have basically the same structure; accordingly, in the following description, the suffixes "B", "C", "M", and "Y" indicating colors will be omitted unless distinction is necessary.

The head units 51 for different colors each have line recording heads 52 for ink-jet recording. The head unit 51 of each color has a plurality of (e.g., three (52*a*, 52*b*, 52*c*)) recording heads 52 arrayed in a staggered formation along the sheet width direction Dw.

Each recording head 52 has in a bottom part of it a plurality of ink ejection nozzles 521. The plurality of ink ejection nozzles 521 are disposed one adjacent another along the sheet width direction Dw so that ink can be ejected over the entire recording area on the sheet S. That is, the recording head 52 has a plurality of ink ejection nozzles 521 that eject ink onto the sheet S (of a recording medium). The recording portion 5 makes the head units 5IB, 51C, 51M, and 51Y for four colors eject ink successively from their respective recording heads 52 toward the sheet S conveyed on the first conveyance belt 411, and thereby records a full-color or monochrome image on the sheet S.

The drying portion 6 is disposed downstream of the recording portion 5 in the sheet conveyance direction, and includes the second belt conveyance section 42. While the sheet S having the ink image recorded on it in the recording portion 5 is being conveyed, in a state held by suction on the second conveyance belt 421, through the recording portion 5, the ink is dried. 100141 The control portion 7 includes a CPU, a storage, and other electronic circuits and components (none is illustrated). The CPU performs processes related to the function of the ink-jet recording apparatus 1 by controlling the operation of the individual blocks provided in it based on control programs and data stored in the storage. The sheet feed portion 3, the sheet conveyance portion 4, the recording portion 5, and the drying portion 6 individually receive instructions from control portion 7 and cooperate to perform recording on the sheet S. The storage is configured as a combination of a non-volatile storage device, such as a program ROM (read-only memory) and a data ROM, and a volatile storage device, such as a RAM (random-access memory).

Figure 4:
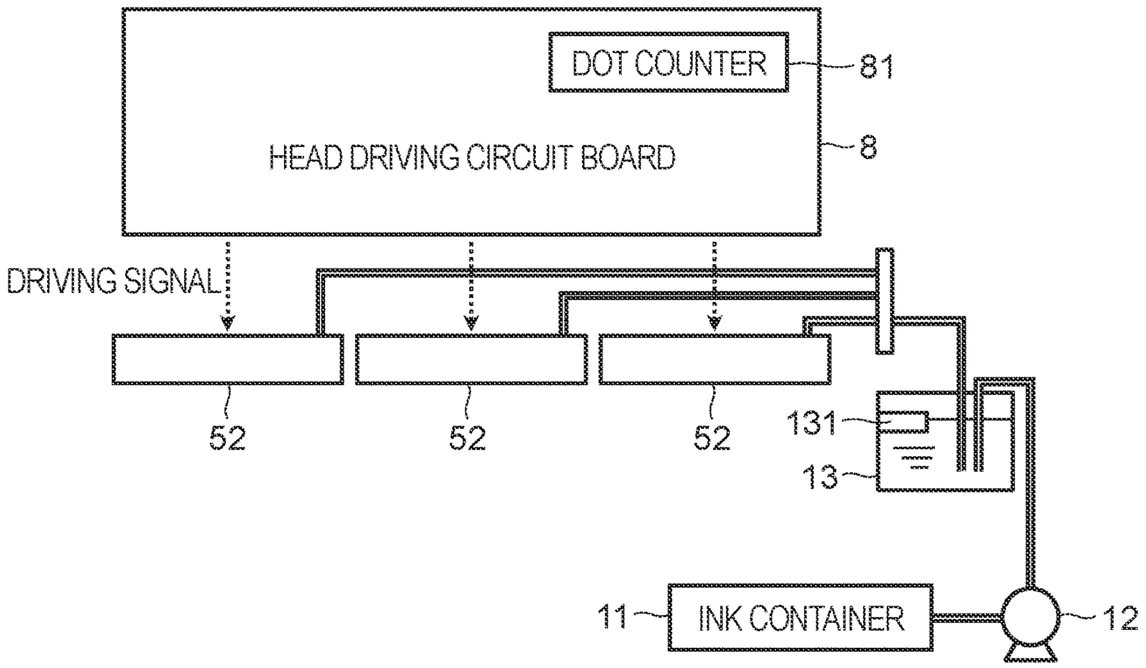
FIG. 4 is a diagram illustrating the configuration of a control system and an ink feed system around the recording portion in the ink jet recording apparatus in FIG. 1.

Next, the configuration around the recording portion 5 will be described with reference to FIG. 4, FIG. 4 is a diagram illustrating the configuration of a control system and an ink feed system around the recording portion 5 in the ink-jet recording apparatus 1. The ink-jet recording apparatus 1 includes an ink container 11, an ink feed pump 12, a sub tank (ink reservoir) 13, and a. head driving circuit board 8.

The ink container 11 is removably mounted in the apparatus body 2. The ink container 11 stores ink to be fed to the sub tank 13. The ink is delivered, via the sub tank 13, from the ink container 11 to the recording heads 52.

The ink feed pump 12 is disposed downstream of the ink container 11 in the ink feed direction. The ink feed pump 12 sucks the ink in the ink container 11 and ejects it toward the sub tank 13. The operation of the ink feed pump 12 is controlled by the control portion 7.

The sub tank 13 stores the ink to be fed to the recording heads 52. The sub tank 13 is provided with an ink amount sensor 131. The ink amount sensor 131 includes a sensor of any type such as an optical type, capacitance type, electrode type, differential pressure type, or a floating type, and senses the amount of ink in the sub tank 13. The ink amount sensor 131 may instead be implemented by sensing the amount of ink based on the fluid level (height of the fluid surface) of the ink stored in the sub tank 13. A sensing signal from the ink amount sensor 131 is transmitted to the control portion 7. The control portion 7 acquires a measured value of the amount of consumed ink as determined based on the amount of ink in the sub tank 13 as sensed by the ink amount sensor 131.

When the amount of ink in the sub tank 13 as sensed by the ink amount sensor 131 becomes smaller than a predetermined value, the control portion 7 controls the ink feed pump 12 to feed ink from the ink container 11 to the sub tank 13. The amount of ink fed to the sub tank 13 is controlled according to the driving time of the, ink feed pump 12. If after the lapse of a predetermined time as the driving time of the ink feed pump 12 the amount of ink in the sub tank 13 as sensed by the ink amount sensor 131 does not become greater than the predetermined value, the control portion 7 judges that the amount of ink in the ink container 11 is zero (i.e., the ink container 11 is empty). The amount of ink in the sub tank 13 is controlled so as to keep a constant water head difference from the recording heads 52.

The head driving circuit board 8 transmits a driving signal to the recording heads 52. The recording heads 52 are provided with driving elements (unillustrated) for the ink ejection nozzles 521. The head driving circuit board 8 transmits to the driving elements in the ink ejection nozzles 521 a driving signal with a predetermined driving waveform and a predetermined driving voltage. The driving waveform for the driving elements in the ink ejection nozzles 521 is previously prepared according to the gradation values of the pixels (dots) in the image to be recorded with the ejected ink droplets. The control portion 7 can control the head driving circuit board 8 to change the amount of ink ejected from the recording heads 52. In this way the control portion 7 controls the operation of the recording heads 52 to perform image recording on the sheet S.

The head driving circuit board 8 has a dot counter 81. The dot counter 81 may be provided in the control portion 7, and may be implemented as either hardware or software. The dot counter 81 measures in a cumulative manner the number of dots in the ink ejected from the recording heads 52. From the cumulative number of dots measured by the dot counter 81 the control portion 7 calculates a calculated value of the amount of consumed ink.

Then, based on the difference between the calculated value of the amount of consumed ink and the measured value of the amount of consumed ink, the control portion 7 changes the amount of ink ejected from the recording heads 52. With this configuration, based on an actual amount of consumed ink, the amount of ink ejected from the recording heads 52 is changed. It is thus possible to optimally control the amount of ink ejected from the recording heads 52.

Figure 5:
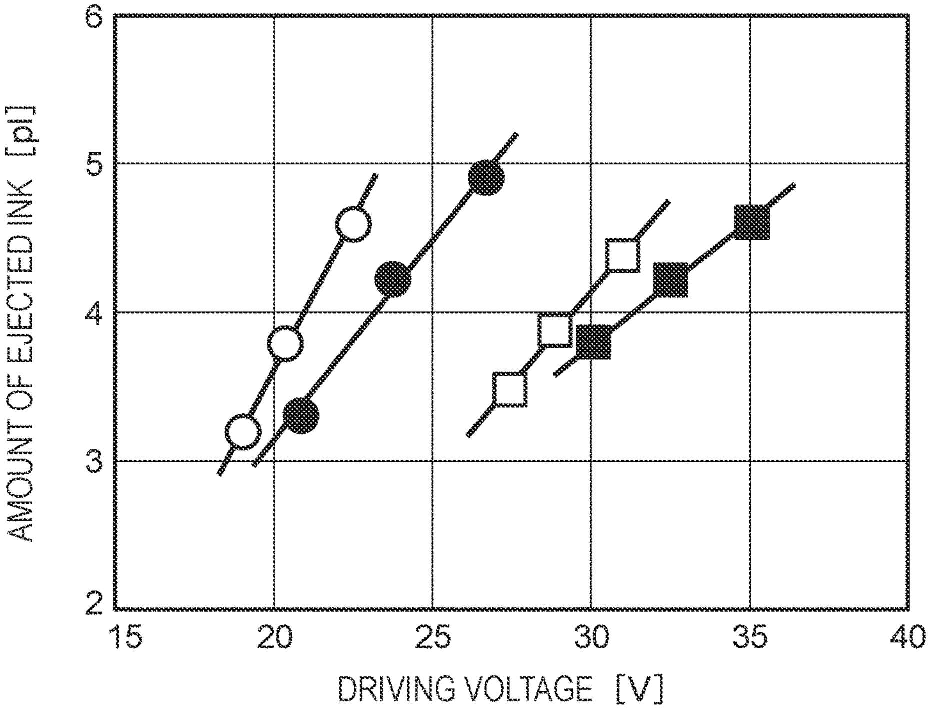
FIG. 5 is a chart showing the relationship between a driving voltage for recording heads and the amount of ejected ink.

FIG. 5 is a chart showing the relationship between the driving voltage for the recording heads 52 and the amount of ejected ink. FIG. 5 shows the amount of ink ejected from the ink ejection nozzles 521 in relation to the driving voltage changed in three steps, for each of four different driving waveforms. FIG. 5 reveals that the driving voltage for the ink ejection nozzles 521 and the amount of ejected ink are in a proportional relationship. Thus, by adjusting the driving voltage for different driving waveforms according to the amount of consumed ink, it is possible to freely change the amount of ink ejected from the recording heads 52. How the amount of ejected ink is changed will now be described in more detail.

Figure 6:
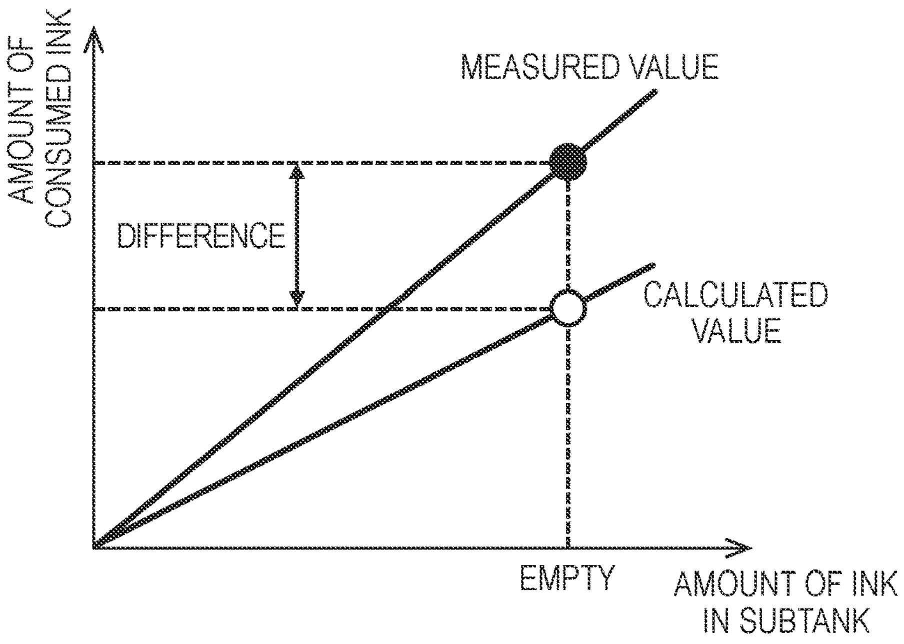
FIG. 6 is a chart showing the relationship between measured and calculated values of the amount of consumed ink, for a case where the amount of ink is sensed to be zero based on the measured value before so expected based on the calculated value.

FIG. 6 is a chart showing the relationship between the measured and calculated values of the amount of consumed ink, for a case where the amount of ink is sensed to he zero based on the measured value before so expected based on the calculated value. According to FIG. 6, the amount of consumed ink with the amount of ink in the sub tank 13 zero is indicated to be greater by the measured value than by the calculated value. This means that the amount of ink in the sub tank 13 is sensed to be zero based on the measured value, before so expected based on the calculated value, of the amount of consumed ink.

If the amount of ink in the sub tank 13 is sensed to be zero based on the measured value of the amount of consumed ink before so expected based on the calculated value of the amount of consumed ink, the control portion 7 reduces the amount of ejected ink. That is, in terms of what is shown in FIG. 6, the control portion 7 makes the measured value of the amount of consumed ink closer to the calculated value of it.

When the amount of ejected ink is reduced, the supplemental amount calculated by Expression (1) below is applied to the control of the amount of ejected ink, where C represents the calculated value of the amount of consumed ink and D represents the difference between the calculated and measured values of the amount of consumed ink.

$$(C-D)/C \tag{1}$$

When the amount of ejected ink is reduced, the control portion 7 adjusts the amount of ejected ink by applying the supplemental amount calculated according to Expression (1) above to the driving voltage for the driving elements in the ink ejection nozzles 521. With this configuration, if the amount of ink is sensed to be zero based on the measured value, before so expected based on the calculated value, of the amount of consumed ink, it is possible to reduce the amount of ejected ink and make the actual amount of consumed ink closer to the calculated (ideal) value. It is thus possible to optimally control the amount of ink ejected from the recording heads 52.

Figure 7:
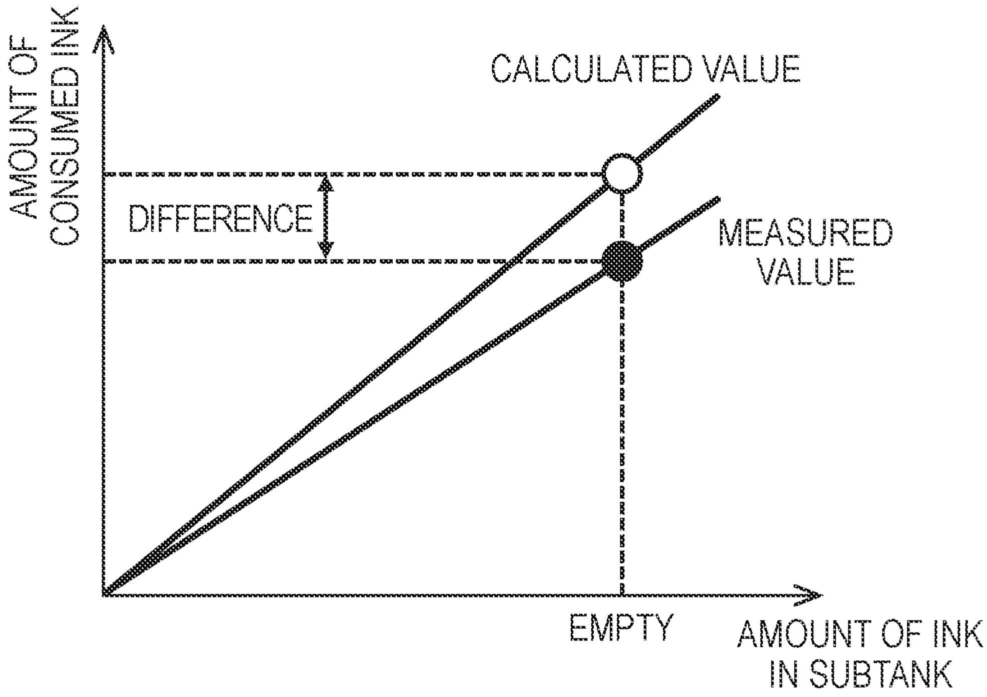
FIG. 7 is a chart showing the relationship between measured and calculated values of the amount of consumed ink, for a case where the amount of ink is expected to be zero based on the calculated value before so sensed based on the measured value.

FIG. 7 is a chart showing the relationship between the measured and calculated values of the amount of consumed ink, for a case where the amount of ink is expected to be zero based on the calculated value before so sensed based on the measured value. According to FIG. 7, the amount of consumed ink with the amount of ink in the sub tank 13 zero is indicated to be smaller by the measured value than by the calculated value. This means that the amount of ink in the sub tank 13 is expected to be zero based on the calculated value, before so sensed based on the measured value, of the amount of consumed ink.

If the amount of ink in the sub tank 13 is expected to be zero based on the calculated value of the amount of consumed ink before so sensed based on the measured value of the amount of consumed ink, the control portion 7 increases the amount of ejected ink. That is, in terms of what is shown in FIG. 7, the control portion 7 makes the measured value of the amount of consumed ink closer to the calculated value of it.

When the amount of ejected ink is increased, the supplemental amount calculated by Expression (2) below is applied to the control of the amount of ejected ink, where C represents the calculated value of the amount of consumed ink and D represents the difference between the calculated and measured values of the amount of consumed ink.

$$(D-C)/C \tag{2}$$

When the amount of ejected ink is increased, the control portion 7 adjusts the amount of ejected ink by applying the supplemental amount calculated according to Expression (2) above to the driving voltage for the driving elements in the ink ejection nozzles 521. With this configuration., if the amount of ink is expected to be zero based on the calculated value, before so sensed based on the measured value, of the amount of consumed ink, it is possible to increase the amount of ejected ink and make the actual amount of consumed ink closer to the calculated (ideal) value. It is thus possible to optimally control the amount of ink ejected from the recording heads 52, The control portion 7 changes the amount of ejected ink also after the ink container 11 is replaced. With this configuration, every time the ink container 11 is replaced, the amount of ejected ink is optimally controlled. It is thus possible to maintain satisfactory image quality and satisfactory image recording productivity.

On the ink-jet recording apparatus 1, the recording heads 52 are maintained with predetermined timing. In the maintenance of the recording heads 52, tier example, ink with increased viscosity or ink containing foreign matter, air bubbles, and the like in the ink ejection nozzles 521 is forcibly discharged out of the ink ejection nozzles 521. This ink is held under the ink ejection surface of the recording heads 52 by surface tension and is removed with a wiper (not illustrated).

In the maintenance of the recording heads 52, when ink is forcibly discharged out of the ink ejection nozzles 521, the control portion 7 changes the amount of ejected ink. With this configuration, it is possible to minimize the effect of changing the amount of ejected ink on the recorded images. It is thus possible to maintain satisfactory image quality and satisfactory image recording productivity.

To eliminate the effect of changing the amount of ejected ink on the recorded image, on the ink-jet recording apparatus 1, the amount of ink ejected during image recording is controlled within an error of 10%. Thus, when the difference between the calculated and measured values of the amount of consumed ink exceeds 10%, the control portion 7 changes the amount of ejected ink. With this configuration, it is possible not to change the amount of ejected ink more often than necessary.

Specifically, in a case where the difference between the calculated and measured values of the amount of consumed ink only slightly exceeds 10%. that is, in a case where the difference exceeds 10% but is equal to or less than a predetermined threshold value, then the amount of ejected ink is adjusted by forcibly discharging ink during the maintenance of the recording heads 52. By contrast, in a case where the difference between the calculated and measured values of the amount of consumed ink greatly exceeds 10%, that is, in a case where the difference exceeds 10% and also exceeds the predetermined threshold value, then the amount of ejected ink is adjusted by forcibly discharging ink during the maintenance of the recording heads 52 and in addition adjusting the driving voltage during regular ink ejection and ejecting ink to the margin or the like on sheets.

While an embodiment of the present disclosure has been described above, it is not meant to limit the scope of the present disclosure, which thus encompasses many modifications without departure from the spirit of the present disclosure.

What is claimed is:

1. An ink-jet recording apparatus comprising:

a recording head having a plurality of nozzles for ejecting ink onto a recording medium;

an ink reservoir portion for storing the ink to be fed to the recording head;

an ink amount sensor for sensing an amount of ink in the ink reservoir portion;

a dot counter for measuring in a cumulative manner a number of dots in the ink ejected from the recording head; and a control portion for controlling operation of the recording head to record an image on the recording medium, wherein the control portion changes an amount of ink ejected from the recording head based on a difference between a calculated value of an amount of consumed ink as calculated based on a cumulative number of dots measured by the dot counter and a measured value of the amount of consumed ink as determined based on an amount of ink in the ink reservoir portion as sensed by the ink amount sensor, and if the amount of ink in the ink reservoir portion is sensed to be zero based on the measured value before the amount of ink in the ink reservoir portion is expected to be zero based the calculated value, the control portion reduces the amount of ejected ink.

2. The ink-jet recording apparatus according to claim 1, wherein the control portion changes the amount of ejected ink when forcibly discharging the ink from the nozzles during maintenance of the recording head.

3. The ink-jet recording apparatus according to claim 1, wherein the control portion changes the amount of ejected ink when the difference between the calculated and measured values exceeds 10%.

4. The ink-jet recording apparatus according to claim 1, further comprising an ink container storing the ink to be fed to the ink reservoir portion, the ink container being removably mounted in a body of the ink-jet recording apparatus, wherein the control portion changes the amount of ejected ink after replacement of the ink container.

5. An ink-jet recording apparatus comprising:

a recording head having a plurality of nozzles for ejecting ink onto a recording medium;

an ink reservoir portion for storing the ink to be fed to the recording head;

an ink amount sensor for sensing an amount of ink in the ink reservoir portion;

a dot counter for measuring in a cumulative manner a number of dots in the ink ejected from the recording head; and a control portion for controlling operation of the recording head to record an image on the recording medium, wherein the control portion changes an amount of ink ejected from the recording head based on a difference between a calculated value of an amount of consumed ink as calculated based on a cumulative number of dots measured by the dot counter and a measured value of the amount of consumed ink as determined based on an amount of ink in the ink reservoir portion as sensed by the ink amount sensor, and if the amount of ink in the ink reservoir portion is expected to be zero based the calculated value before the amount of ink in the ink reservoir portion is sensed to be zero based on the measured value, the control portion increases the amount of ejected ink.

6. The ink-jet recording apparatus according to claim 5, wherein the control portion changes the amount of ejected ink when forcibly discharging the ink from the nozzles during maintenance of the recording head.

7. The ink-jet recording apparatus according to claim 5, wherein the control portion changes the amount of ejected ink when the difference between the calculated and measured values exceeds 10%.

8. The ink-jet recording apparatus according to claim 5, further comprising an ink container storing the ink to be fed to the ink reservoir portion, the ink container being removably mounted in a body of the ink-jet recording apparatus, wherein the control portion changes the amount of ejected ink after replacement of the ink container.

* * * * *